3,347,831
POLYMERIZATION OF ALDEHYDES WITH A METAL PHOSPHATE CATALYST
Paul A. Naro, West Trenton, and Robert D. Offenhauer, Pennington, N.J., assignors to Mobil Oil Corporation, a corporation of New York
No Drawing. Filed Mar. 3, 1964, Ser. No. 349,126
14 Claims. (Cl. 260—67)

The present invention relates to a process for the catalytic polymerization of aldehydes. More particularly, the present invention relates to a process for the polymerization of aldehydes in the presence of a catalytic amount of high surface area metal phosphate compounds hereinafter described, to produce polyaldehydes having a high degree of polymerization.

The polymerization of aldehydes is known in the art wherein various polymerization catalysts such as thoria, chromia, molybdena, silica, organo-metallics, tertiary phosphines, sodium amalgam, polyphosphoric acid-amine combinations, lithium alkoxides, carbonates, sulfates, and peroxides have been used. Radiation and high pressure have also been employed to polymerize aldehydes.

In accordance with the present invention, it has now been found that high surface area Group III–b metal phosphates will catalyze the polymerization of aldehydes to yield polymers having molecular weights of one half million or greater.

Accordingly, it is a principal object of the present invention to provide a novel process for the catalytic polymerization of aldehydes to form solid polymeric materials utilizing catalytic amounts of specific metal phosphate compounds. Another object of the present invention is to provide a process for the polymerization of aldehydes which avoids disadvantages of the prior art. The above and other objects and features of the present invention will become more apparent from the following detailed description and the appended claims.

In the broadest aspect, the present invention relates to a process for the catalytic polymerization of aldehydes to form solid homopolymers or solid copolymers thereof which comprises contacting the aldehydes with a metal phosphate which has a surface area in the range from about 75 to about 700 square meters per gram wherein the metal portion of said phosphate is a metal of Group III–b of the Periodic Table which includes boron, aluminum, gallium, indium, and thalium. The aldehydes which may be polymerized in accordance with the present invention are preferably saturated and include acetaldehyde, propanal, butanal, pentanal, and chlorinated aldehydes such as chloral. Acetaldehyde is the preferred monomer for the practice of the present invention. The acetaldehyde need not necessarily be present as bulk monomer but may be obtained from an acid solution of paraldehyde. Copolymers of such aldehydes can also be produced by the process of this invention.

In accordance with a preferred embodiment of the invention, a polyacetaldehyde was prepared by distilling acetaldehyde over on a high surface area aluminum phosphate catalyst which catalyst was within a polymerization vessel provided with a Dry Ice-acetone trap. After standing, acetaldehyde was then distilled from a polymerizing mixture of monomer and polymers thereof within this vessel into a second polymerization vessel containing a catalytic amount of high surface area aluminum phosphate. The second polymerization vessel was sealed off and allowed to stand in a Dry Ice-acetone bath for several days. After recovery and purification, there was obtained a 50 percent yield of a very elastic, tan polyacetaldehyde having an estimated molecular weight of about 800,000.

In the first polymerization zone, polymerization inhibitors which are unavoidably initially present in the monomer are consumed. The monomer vapor reaching the second polymerization zone is thus quite pure and a more stable polymer may thus be obtained. While the polymerization reaction may proceed after only one distillation, the reaction time will be considerably longer and the polymer will not be as stable. Therefore, the redistillation procedure using two polymerization zones is much to be preferred.

Upon analysis, some unsaturation was observed in the polymer. It is therefore apparent that the polymer is not a pure polyacetal, and may be a mixed polyacetal-polyaldo copolymer.

The high surface area Group III–b metal phosphates can be prepared by the reaction of phosphoric acid with an aqueous solution of a suitable Group III–b metal compound such as an aluminum halide. The resulting product is neutralized and the gel which is formed is extracted with a suitable organic solvent, dried and calcined. The surface area of the metal phosphate catalyst can range from about 75 to about 700 square meters per gram. It is preferable, however, to control the conditions of preparation to provide a phosphate which has a surface area in the range from about 275 to about 600 square meters per gram. The phosphates which have a surface area in excess of 275 square meters per gram have high polymerization activity in the subject process. The use of Group III–b metal phosphates which have surface areas below about 75 square meters per gram have been generally found to be less effective catalysts for use in the process of this invention.

The catalyst concentration used can be varied over a broad range. It has been found that catalyst concentrations from about 0.005 to 15 weight percent or higher, preferably from 0.1 to about 5 weight percent based on the weight of the monomer within the respectively polymerization zones may be employed.

The aldehyde is distilled over under vacuum at temperatures of from about $-30°$ to about $-100°$ C. and preferably at temperatures in the order of $-78°$ C. The polymerizing monomer is maintained in contact with the catalyst at such low temperatures for an extended period of time, for example, between about 5 to 20 days or longer. When polymerizing a chlorinated aldehyde such as chloral which yields a polymer having flame retarding properties, the longer reaction times are employed.

Instead of using bulk monomer, the aldehyde monomer may be initially present in a nonpolar solvent such as hexane, heptane, or cyclohexane.

After the polymerization reaction is complete, the polymer may be separated from the unreacted materials by any suitable method. For example, the polymer may be removed from the polymerization vessel, dissolved in a solvent, centrifuged to remove the catalyst, and freeze dried. A suitable inhibitor or antioxidant such as 1-naphthyl amine or 2-naphthyl amine is preferably added to the solvent to stabilize the polymer.

The polymers that can be obtained by the practice of the invention are solid substances that have at least and usually more of a variety of uses including the preparation of synthetic rubbers, resins and fibers with or without modification, and adhesives.

The following examples will serve to further illustrate the invention without limiting the same.

Examples I and II illustrate the preparation of high surface area aluminum phosphate catalysts.

*Example I*

To a rapidly stirred solution of 116 g. of aluminum chloride hexahydrate in 180 ml. of water was added 32 ml. of 85% orthophosphoric acid. The clear solution was cooled to 0° C. and neutralized with 113 ml. of liquid ethylene oxide to react with hydrochloric acid (from the aluminum chloride) and aid in gel formation. The temperature of the mixture was not allowed to exceed 5° C. during the addition. The cooling bath was removed, and while warming to room temperature, the mixture set to a stiff, white hydrogel. This was broken up with a spatula, exhaustively extracted with propanol-2 to remove water, and dried under vacuum to a free-flowing powder. The catalyst was activated by calcining in air at 600° C. to 700° C. for 24 hours. A typical analysis:

|  | Found | Theoretical |
|---|---|---|
| Aluminum, wt. percent | 20.4 | 22.1 |
| Phosphorus | 24.2 | 25.4 |
| Carbon | 0.1 | 0 |
| Hydrogen | 0.7 | 0 |
| Surface Area, m.$^2$/g | 424 |  |

The generated acid could also be neutralized by stepwise addition of 1 M ammonia. The solution gelled; aluminum phosphate was isolated as before. The orthophosphoric acid could be replaced by diammonium hydrogen phosphate.

*Example II*

In a glass reactor, 160 parts of 85% phosphoric acid is slowly added to a rapidly stirred solution of 580 parts of hydrated aluminum chloride in 900 parts of water. After the addition of the phosphoric acid, the resultant solution is cooled in an ice bath, neutralized with ethylene oxide and allowed to warm to room temperature on standing overnight. The gel which is formed is broken up and extracted with isopropanol to remove the water and other soluble material. After extraction, the product is air dried and then calcined at 600° C. for 3 hours. The resulting product is aluminum phosphate which has a surface area of 545 square meters per gram and contains 0.1% carbon.

*Example III*

This example illustrates the preparation of a polyacetaldehyde having a high degree of polymerization.

The apparatus used was a vacuum system consisting of three tubes. These tubes are connected through 1 mm. capillaries and are provided with Teflon stopcocks. The apparatus is first heated under vacuum and flushed with pure, dry nitrogen. The first tube is charged with 20 grams of acetaldehyde of commercial purity. The second and third tubes are each charged with 0.6 gram of the catalyst of Example I. The tube containing the acetaldehyde is chilled in a Dry Ice-acetone trap and the system is placed under high vacuum. Both catalyst samples are heated strongly until all adsorbed gases are driven off. (The catalyst "boils" as long as adsorbed gases are present.) The entire apparatus is also heated strongly while under vacuum and then sealed. The Dry Ice trap is removed from the acetaldehyde tube and placed over one of the catalyst tubes such that the acetaldehyde slowly distils onto the catalyst. This is continued until about 15 grams of acetaldehyde have been collected. The catalyst tube is closed off from the rest of the apparatus and let stand for 24 hours. The acetaldehyde is then distilled from the first catalyst tube into the second catalyst tube, leaving behind about 5 grams of monomer and polymer. The second tube is closed off and allowed to stand in Dry Ice-acetone for 13 days. The white, elastic polymer is removed, dissolved in benzene containing one gram of 2-naphthylamine, centrifuged to remove the catalyst and freeze dried. There is obtained 5 grams (50% yield) of tan, rubbery polymer having a reduced viscosity of 3.6 (0.1% in 2-butanone). This corresponds to a molecular weight of approximately 800,000.

When reference is made to the Periodic Table in the specification and claims, such reference is to the Periodic Table of Mendeleeff as found in Mellor's Modern Inorganic Chemistry, Revised Edition, 1961.

What is claimed is:
1. A process which comprises contacting a saturated aldehyde with a metal phosphate catalyst which has a surface area in the range from about 275 to about 600 square meters per gram, wherein the metal portion of said metal phosphate is selected from Group IIIb of the Periodic Table; for a period of time sufficient to produce a solid polymer.

2. A process which comprises contacting a saturated aldehyde selected from the group consisting of acetyldehyde, propanal, butanal, pentanal, chloral and mixtures thereof with a metal phosphate catalyst which has a surface area in the range from about 275 to about 600 square meters per gram, wherein the metal portion of said metal phosphate is selected from Group IIIb of the Periodic Table; at a temperature in the range from about −100° C. to about −30° C. for a period of time sufficient to produce a solid polymer.

3. A process which comprises contacting acetaldehyde with an aluminum phosphate catalyst which has a surface area in excess of about 75 square meters per gram, and keeping the acetaldehyde in contact with the catalyst until a solid polymer is formed.

4. A process which comprises contacting a low molecular weight saturated aldehyde with an aluminum phosphate catalyst which has a surface area in the range from about 275 to about 600 square meters per gram; for a period of time sufficient to produce a solid polymer.

5. A process which comprises contacting a saturated aldehyde selected from the group consisting of acetaldehyde, propanal, butanal, and pentanal with about 0.1 to about 5 percent by weight, based on the weight of the aldehyde, of a neutralized aluminum phosphate catalyst which has a surface area in excess of about 75 square meters per gram.

6. A process which comprises contacting acetaldehyde with a metal phosphate catalyst which has a surface area in excess of about 75 square meters per gram, wherein the metal portion of said metal phosphate is selected from Group III–b of the Periodic Table; for a period of time sufficient to produce a solid polymer.

7. A process of producing a polyaldehyde having a a high degree of polymerization, which comprises condensing vapor of a saturated aldehyde monomer on a metal phosphate catalyst which has a surface area in excess of about 75 square meters per gram, wherein the metal portion of said metal phosphate is selected from Group III–b of the Periodic Table; and keeping the condensate in contact with the catalyst for a period of time sufficient to produce a solid polymer.

8. A process of producing a polyacetaldehyde having a high degree of polymerization, which comprises condensing acetaldehyde vapor on a metal phosphate catalyst which has a surface area in excess of about 75 square meters per gram, wherein the metal portion of said metal phosphate is selected from Group III–b of the Periodic Table; and keeping the condensate in contact with the catalyst for a period of time sufficient to produce a solid polymer.

9. A process of producing polyaldehydes which comprises passing aldehyde vapor from a polymerizing mixture of a saturated aldehyde monomer and polymers thereof within a first polymerization zone into a second polymerization zone; condensing the aldehyde vapor within said second polymerization zone; and contacting the condensate with a metal phosphate catalyst which has a surface in excess of about 75 square meters per gram, wherein the metal portion of said metal phosphate is selected from Group III–b of the Periodic Table; for a period of time sufficient to produce a solid polymer.

10. A process of producing polyaldehyde which comprises passing aldehyde vapor from a polymerizing mixture of a saturated aldehyde monomer and polymers thereof within a first polymerization zone into a second polymerization zone; condensing the aldehyde vapor within said second polymerization zone; and contacting the condensate with a metal phosphate catalyst which has a surface in excess of about 75 square meters per gram, wherein the metal portion of said metal phosphate is selected from Group III-b of the Periodic Table; at a temperature in the range from about −100° C. to about −30° C. for between about 5 to about 15 days.

11. A process of producing polyaldehyde which comprises passing aldehyde vapor from a polymerizing mixture of aldehyde monomer selected from group consisting of acetaldehyde, propanal, butanal, pentanal and chloral and polymers thereof which are in contact with an aluminum phosphate catalyst having a surface area in excess of about 75 square meters per gram within a first polymerization zone into a second polymerization zone; condensing the aldehyde vapors within the second polymerization zone; and contacting the condensate with additional aluminum phosphate catalyst having a surface area in excess of about 75 square meters per gram for a period of time sufficient to produce a solid polymer having a high degree of polymerization.

12. A process of producing polyaldehydes which comprises passing acetaldehyde vapor from a polymerizing mixture of acetaldehyde monomer and polymers thereof which are in contact with an aluminum phosphate catalyst having a surface area in excess of about 275 square meters per gram within a first polymerization zone into a second polymerization zone; condensing the acetaldehyde vapors within the second polymerization zone; and contacting the condensate with additional aluminum phosphate catalyst having a surface area in excess of about 275 square meters per gram for a period of time sufficient to produce a solid polymer having a high degree of polymerization.

13. A process of producing polyaldehydes which comprises passing aldehyde vapor from a polymerizing mixture of a saturated aldehyde monomer and polymers thereof which are in contact with an aluminum phosphate catalyst having a surface area in excess of about 275 square meters per gram within a first polymerization zone into a second polymerization zone; condensing the aldehyde vapors within the second polymerization zone; and contacting the condensate with additional aluminum phosphate catalyst having a surface area in excess of about 275 square meters per gram at a temperature in the range from about −100° C. to about −30° C. for between about 5 to about 20 days.

14. A process of producing a polyaldehyde having a high degree of polymerization, which comprises condensing vapor of an aldehyde selected from the group consisting of acetaldehyde, propanal, butanal, pentanal and chloral on a metal phosphate catalyst which was a surface area in excess of about 75 square meters per gram, wherein the metal portion of said metal phosphate is selected from Group III-b of the Periodic Table; and keeping the condensate in contact with the catalyst for a period of time sufficient to produce a solid polymer.

References Cited

UNITED STATES PATENTS 3,221,059    11/1965    Fukui et al. _____ 260—615

WILLIAM H. SHORT, *Primary Examiner.*

L. M. PHYNES, *Assistant Examiner.*